United States Patent
Jung et al.

(10) Patent No.: US 7,418,204 B2
(45) Date of Patent: Aug. 26, 2008

(54) PASSIVE OPTICAL NETWORK SYSTEM PROVIDING SIMULTANEOUSLY BOTH BROADCASTING SERVICE AND DATA SERVICE

(75) Inventors: Dae-Kwang Jung, Suwon-shi (KR); Byung-Chang Kang, Yongin-shi (KR); Yun-Je Oh, Yongin-shi (KR); Tae-Sung Park, Suwon-shi (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 773 days.

(21) Appl. No.: 10/600,694

(22) Filed: Jun. 20, 2003

(65) Prior Publication Data

US 2004/0131358 A1     Jul. 8, 2004

(30) Foreign Application Priority Data

Jan. 2, 2003     (KR) ............... 10-2003-0000135

(51) Int. Cl.
*H04J 14/02*     (2006.01)
(52) U.S. Cl. .................. 398/68; 398/67; 398/157; 398/92; 398/72
(58) Field of Classification Search ............... 398/66, 398/67, 70, 71, 79, 68, 92, 157
See application file for complete search history.

(56) References Cited

U.S. PATENT DOCUMENTS

| | | | | |
|---|---|---|---|---|
| 5,594,748 | A * | 1/1997 | Jabr | 372/38.09 |
| 5,742,414 | A * | 4/1998 | Frigo et al. | 398/66 |
| 6,577,422 | B1 * | 6/2003 | Frigo et al. | 398/49 |
| 6,594,287 | B1 * | 7/2003 | Seytter | 370/539 |
| 6,895,185 | B1 * | 5/2005 | Chung et al. | 398/72 |
| 2002/0093709 | A1 | 7/2002 | Kim et al. | |
| 2004/0131357 | A1 * | 7/2004 | Farmer et al. | 398/67 |

FOREIGN PATENT DOCUMENTS

EP     0865173 A2     9/1998

(Continued)

OTHER PUBLICATIONS

"Bidirectional Passive Optical Network for the Transmission of WDM Channels with Digital Broadcast Video Signals," OFC, Mar. 20, 2002, pp. 767-768.*

(Continued)

*Primary Examiner*—Leslie Pascal
(74) *Attorney, Agent, or Firm*—Cha & Reiter, LLC

(57) ABSTRACT

A passive optical network system is disclosed that simultaneously provides both broadcasting service and data service. The passive optical network (PON) amplifies the optical signals for the broadcasting service in an optical amplifier media of the local office by pumping optical signals generated from the central office and provides the optical signals for the broadcasting service to the subscriber terminals. Therefore, the present invention can simultaneously provide broadcasting service and data service for more subscribers without reducing the number of subscribers to the PON. Also, the present invention uses a plurality of optical sources for the data service and the broadcasting service and receives the optical signals generated from the optical sources by using a plurality of optical receivers in the subscriber terminals, and thus can provide a greater amount and variety of data services and broadcasting services.

5 Claims, 5 Drawing Sheets

FOREIGN PATENT DOCUMENTS

| | | |
|---|---|---|
| EP | 1227606 A1 | 10/1999 |
| EP | 1235433 A2 | 8/2002 |
| JP | 62-290219 | 12/1987 |
| JP | 02-282226 | 11/1990 |
| JP | 05-502334 | 4/1993 |
| JP | 2001-333047 | 11/2001 |

OTHER PUBLICATIONS

"Spectrum-Sliced Bidirectional WDM PON," OFCC, Mar. 2000, pp. 160-162.*

* cited by examiner

PASSIVE OPTICAL NETWORK SYSTEM PROVIDING SIMULTANEOUSLY BOTH BROADCASTING SERVICE AND DATA SERVICE

CLAIM OF PRIORITY

This application claims priority to an application entitled "Passive optical network system providing simultaneously both broadcasting service and data service," filed in the Korean Intellectual Property Office on Jan. 2, 2003 and assigned Serial No. 2003-135, the contents of which are hereby incorporated by reference.

BACKGROUND OF THE INVENTION

1. Field of the Invention

The present invention relates to a passive optical network (PON), and more particularly, to a passive optical network system providing simultaneously both broadcasting service and data service.

2. Description of the Related Art

With the rapid increase of the number of Internet subscribers, the variety of Internet services, the appearance of large capacity contents, etc., subscribers' demand for a large capacity of data services is exponentially increasing. However, the conventional networks based on copper wires have limitations with respect to transmission speed and the integrity of data, so that it is not possible to satisfy the demand for data services by subscribers today and in the future.

Meanwhile, due to the development of electronic elements in recent years, the optical communication systems can transmit data at speeds of several tens of Tbps or more. Therefore, in order to provide data services at high speed and with good integrity, the construction of a FTTH (Fiber To The Home) system, which connects optical fibers directly to the subscriber terminals, is required. The FTTH system can provide the transmission speed and the integrity demanded for data services today and in the future. A passive optical network (hereinafter, referred to as "PON") is being highlighted as a FTTH system, since the PON is one of the most efficient and economical networks from the viewpoint of its construction and maintenance.

FIG. 1 illustrates a conventional PON comprising a central office 10, an optical divider coupler 21, and a plurality of subscriber terminals 30, which are connected with one another by transmission optical fibers 40 and 50.

The central office 10 provides optical communication service for the subscriber terminals 30 through the optical divider coupler 21. That is, the optical divider coupler 21 is connected with the central office 10 and the subscriber terminals 30 through the transmission optical fibers 40 and 50, thus being able to transmit the optical communication service provided from the central office 10 to the subscriber terminals 30.

To this end, the central office 10 includes a downstream optical source 11 for providing an optical source needed in order to transmit data to the subscriber terminals 30 (downstream transmission), an upstream optical receiver 13 for receiving data transmitted upstream from the subscriber terminals 30, and a first wavelength division multiplexer 15 for filtering and transmitting the signals output from the downstream optical source 11 and the signals transmitted to the upstream optical receiver 13. The subscriber terminals 30 include an upstream optical source 31 for providing an optical source needed in order to upstream transmit data to the central office 10, a downstream optical receiver 33 for receiving data transmitted downstream from the central office 10, and a second wavelength division multiplexer 35 for filtering and transmitting the signals output from the upstream optical source 31 and the signals transmitted to the downstream optical receiver 33. In other words, the optical divider coupler 21 connects a central office 10 with the subscriber terminals 30.

Recently, a number of studies have been addressed to providing broadcasting service through a PON, which has historically been provided by a different hybrid fiber coaxial network (HFC network). That is because the PON may reduce the cost of constructing and maintaining the network for providing data service and broadcasting service simultaneously.

Meanwhile, the analog broadcasting system must have a high CNR (carrier to noise ratio) value so as to maintain clear screen quality on the subscriber terminals. Therefore, in constructing the network system for providing the broadcasting service by the PON, the optical signals being input into the optical receivers in the subscriber terminals must necessarily maintain a very high level of output so as to maintain a proper CNR.

By contrast, digital broadcasting in the future requires a relatively low CNR as compared with analog broadcasting, thus enabling the subscriber terminals to have clear screen quality, though the optical signals input into the optical receivers of the subscriber terminals have a relatively low level of output. However, in order to increase the capacity of the broadcasting channels, the output level must be increased of the optical signals being input into the optical receivers in the subscriber terminals in consideration of additional noise generated by the increased broadcasting signals, so that the optical signals may maintain a proper CNR.

Consequently, when the broadcasting service is provided by a PON, the PON must be constructed so as to provide optical signals of a high level output for the optical receivers in the subscriber terminals, FIG. 2 illustrates a conventional PON for simultaneously providing both broadcasting service and data service and comprises, similar to the conventional PON illustrated in FIG. 1, a central office 10a, an optical divider coupler 21, and a plurality of subscriber terminals 30a, which are connected with one another by transmission optical fibers 40 and 50, and each component of equipment is also similar to those illustrated in FIG. 1.

FIGS. 1 and 2 differ only in that the central office 10a further comprises a broadcasting optical source 17 for a broadcasting service and an optical amplifier 19 for amplifying the signals output from the broadcasting optical source 17, and the subscriber terminals 30a further comprise a broadcasting optical receiver 37 for receiving the signals transmitted from the broadcasting optical source 17. The broadcasting optical source 17 modulates and outputs, according to the broadcasting signals, the optical signals of the wavelength which is distinguished from the wavelength of the optical signals outputted from the downstream optical source 11.

Therefore, a first wavelength division multiplexer 15a in the central office 10a multiplexes and outputs the optical signals, which are output from the broadcasting optical source 17 and amplified by the optical amplifier 19, and the optical signals output from the downstream optical source 11. Also, a second wavelength division multiplexer 35a in the subscriber terminals 30a demultiplexes the multiplexed optical signals as described above, and separates data service signals and broadcasting service signals. The separated data signals and broadcasting signals are provided for subscriber terminals after being data processed by the downstream optical receiver 33 and the broadcasting optical receiver 37, respectively.

As illustrated in FIG. 2, in order for a PON to simultaneously provide broadcasting service and data service, the conventional art directly amplifies the optical signals modulated according to the broadcasting signals by inputting them into the optical amplifier 19, so as to raise the output level of the optical signals being output for broadcasting service from the central office 10a, in order to raise the output level of optical signals being input into the broadcasting optical receiver 37 in the subscriber terminals 30a.

However, when the optical signals for broadcasting service, having a higher output level than a basic value, are input to the transmission optical fiber 40, the noise component is rapidly raised by the nonlinear quality of optical fiber, so that it is impossible to maintain the proper CNR (carrier to noise ratio) required for the broadcasting service. Thus, the output level of the optical signals for broadcasting service, which is amplified by the optical amplifier 19 in the central office 10a and is input to the transmission optical fiber 40, is limited below a basic value by the nonlinear quality of optical fiber.

Therefore, in order to maintain the optical signals, which are input into the optical receivers (especially, the broadcasting optical receiver 37) in the subscriber terminals 30a, in the high level of the output, the number of branches of the optical divider coupler 21 must be reduced, thus it is possible to reduce the loss of the optical signals for broadcasting service.

However, since each PON determines the accessible number of the subscriber terminals according to the number of branches of the optical divider coupler 21, the number of subscriber terminals being accepted by the PON cannot help but be reduced when the broadcasting service is provided by the PON as a conventional art. For this reason, more PONs must be built. Consequently, to use the conventional PON it is more costly and time consuming due to the additional construction and maintenance.

Therefore, in order to efficiently provide the broadcasting service by a PON, it is necessary to develop a PON which is able to simultaneously provide both broadcasting service and data service without reducing the number of subscriber terminals.

Also, in order to increase the number of broadcasting channels for service according to the request of the subscriber, the conventional art must further increase the output level of the optical signals being input into the broadcasting optical receiver 37 of the subscriber terminals 30a because of the additional noise generated by the increased number of broadcasting channel signals, thus enabling the signals to be maintained within a proper CNR for clear screen quality. Therefore, it is necessary to develop a network system that can accept more broadcasting channels.

SUMMARY OF THE INVENTION

The present invention is a passive optical network (PON) system that simultaneously provides broadcasting service and data service to more subscribers without reducing the number of subscriber terminals.

Further, the present invention is a passive optical network system that is able to accept more broadcasting channels.

A first embodiment of the present invention is a passive optical network system comprising a central office, a local office, and a plurality of subscriber terminals, the central office and the local office being connected with each other through an optical fiber, the subscriber terminals being connected with the local office, the central office providing optical communication service to the subscriber terminals through the local office, the central office further comprising: a broadcasting optical source which outputs broadcasting optical signals that provide a broadcasting service to the subscriber terminals; a pumping optical source that outputs pumping optical signals to amplify the broadcasting optical signals output from the broadcasting optical source; a downstream optical source that outputs downstream optical signals to provide a downstream data service to the subscriber terminals; an upstream optical receiver that receives upstream data service signals transmitted from the subscriber terminals and then converts the received signals into electric signals; and a wavelength division multiplexer that multiplexes the broadcasting optical signals output from the broadcasting optical source, the pumping optical signals output from the pumping optical source, and the downstream optical signals output from the downstream optical source, such that the multiplexed signals are output, the wavelength division multiplexer filtering input upstream data service signals, such that filtered signals are output to the upstream optical receiver.

A second embodiment of the present invention is a passive optical network system comprising a central office, a local office, and a plurality of subscriber terminals, the central office and the local office being connected with each other through an optical fiber, the subscriber terminals being connected with the local office, the central office providing optical communication service to the subscriber terminals through the local office, the central office further comprising: a plurality of broadcasting optical sources that output different wavelengths of broadcasting optical signals from one another such that multi-channel broadcasting service is provided to the subscriber terminals; a pumping optical source which outputs pumping optical signals for amplifying the broadcasting optical signals outputted from the broadcasting optical sources; a first wavelength division multiplexer which multiplexes the broadcasting optical signals outputted from the broadcasting optical sources and the pumping optical signals outputted from the pumping optical source; a downstream optical source which outputs downstream optical signals for providing downstream data service to the subscriber terminals; an upstream optical receiver which receives upstream data service signals transmitted from the subscriber terminals, such that the received signals are converted into electric signals; and a second wavelength division multiplexer that multiplexes the broadcasting optical signals and the pumping optical signals outputted from the pumping optical source multiplexed by the first wavelength division multiplexer and the downstream optical signals outputted from the downstream optical source, such that multiplexed signals are output, the second wavelength division multiplexer filtering inputted upstream data service signals, such that filtered signals are output to the upstream optical receiver.

In an embodiment of the present invention that provides a passive optical network (PON) system comprising a central office, a local office, and a plurality of subscriber terminals, the local office and the central office being connected with each other through an optical fiber, the subscriber terminals being connected with the local office, the central office providing optical communication service to the subscriber terminals through the local office, the local office further comprises: a first wavelength division multiplexer that receives multiplexed signals including pumping optical signals from the central office, and divides downstream optical signals for downstream data service, broadcasting optical signals for broadcasting service and the pumping optical signals by demultiplexing the multiplexed signals, the first wavelength division multiplexer multiplexing upstream data service signals transmitted from the subscriber terminals; an optical amplifier media which receives the broadcasting optical signals and the pumping optical signals from the first wavelength division multiplexer, such that the broadcasting optical signals are amplified by the pumped optical amplifier media; a second wavelength division multiplexer that multiplexes the broadcasting optical signals amplified by the optical amplifier media and the downstream optical signals divided by the first wavelength division multiplexer, the second wavelength division multiplexer demultiplexing the upstream data service signals transmitted from the subscriber terminals; and an optical divider coupler which divides the multiplexed optical signals transmitted from the second wavelength division multiplexer, such that the divided signals are distributed to the subscriber terminals, the optical divider coupler coupling the upstream data service signals transmitted from the subscriber terminals.

In an embodiment of the present invention that provides a passive optical network (PON) system comprising a central office, a local office, and a plurality of subscriber terminals, the subscriber terminals being connected with the local office through an optical fiber, the central office and the local office being connected with each other, the central office providing optical communication service to the subscriber terminals through the local office, the subscriber terminals further comprise: a wavelength division multiplexer which demultiplexes multiplexed optical signals transmitted downstream from the local office, such that downstream optical signals are divided for downstream data service and broadcasting optical signals are divided for broadcasting service, the wavelength division multiplexer multiplexing upstream data service signals for transmission from the subscriber terminals to the local office; at least one downstream data optical receiver that receives the downstream optical signals divided by the wavelength division multiplexer, such that the received optical signals are converted into electric signals; at least one broadcasting data optical receiver that receives the broadcasting optical signals divided by the wavelength division multiplexer, such that the received optical signals are converted into electric signals; and an upstream optical source that generates upstream data service signals for transmission to the local office through the wavelength division multiplexer.

DETAILED DESCRIPTION OF THE PREFERRED EMBODIMENT

First Embodiment

Figure 1:
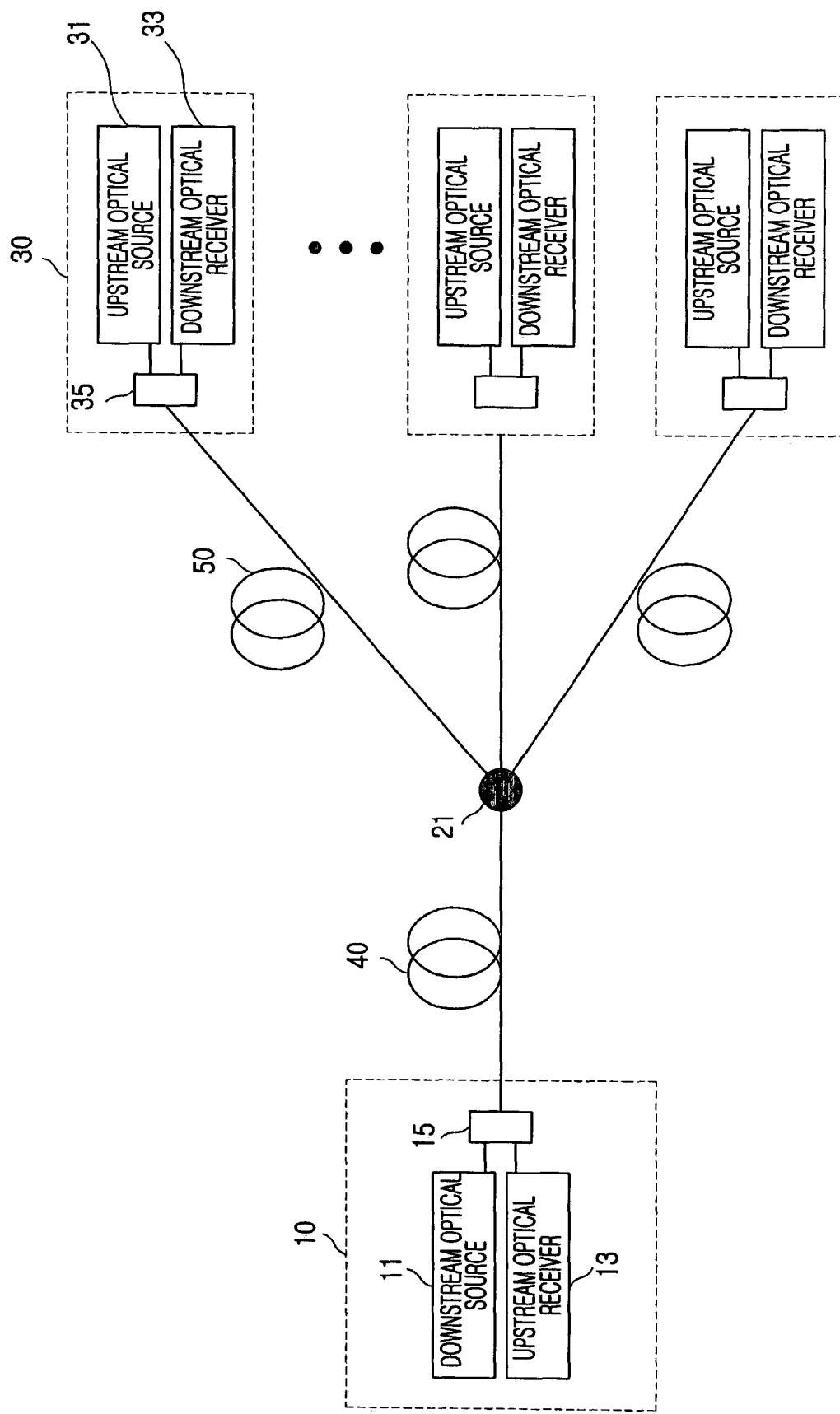
FIG. 1 illustrates a conventional passive optical network (PON).
Figure 2:
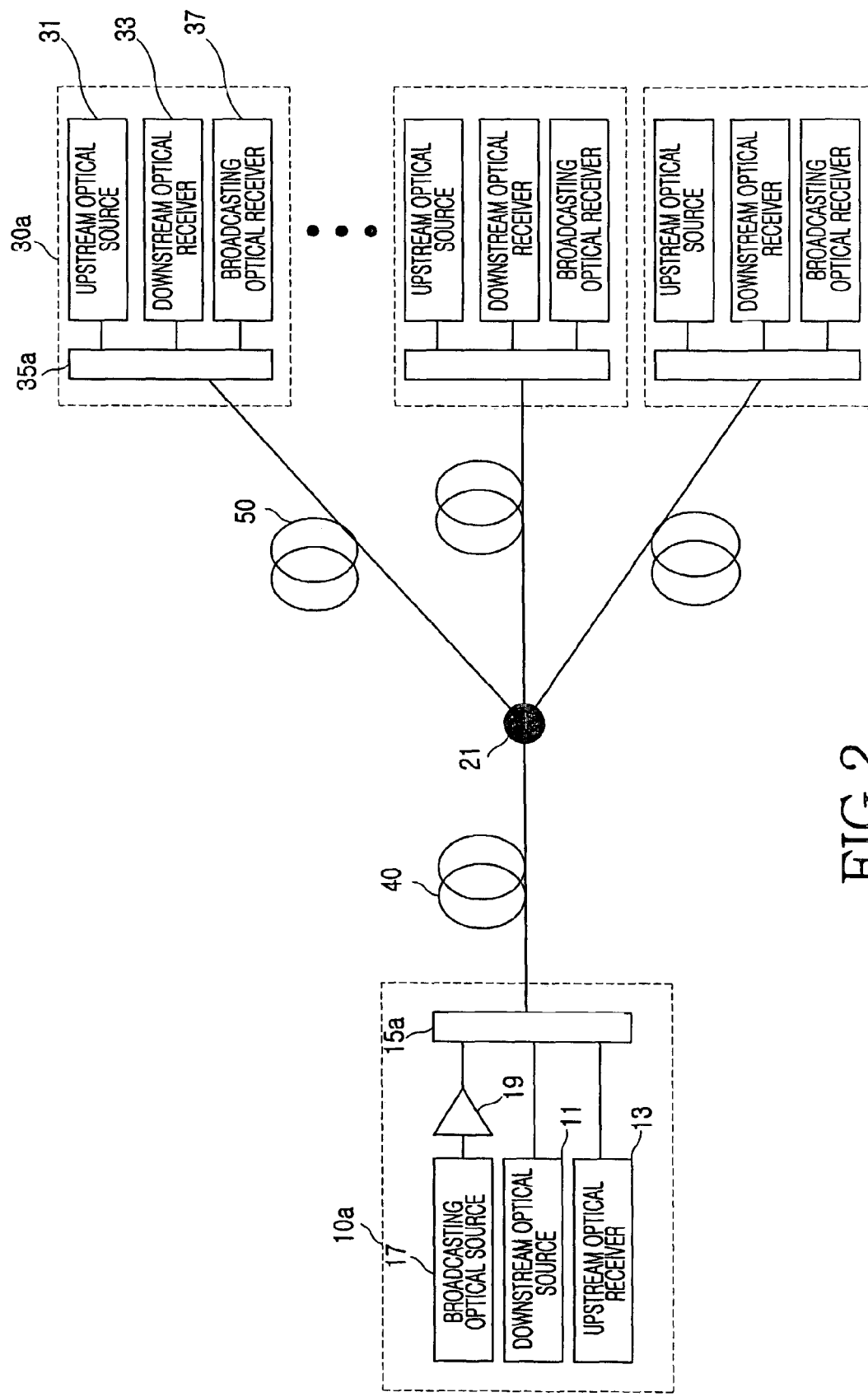
FIG. 2 illustrates a conventional passive optical network (PON) for providing simultaneously both broadcasting service and data service.
Figure 3:
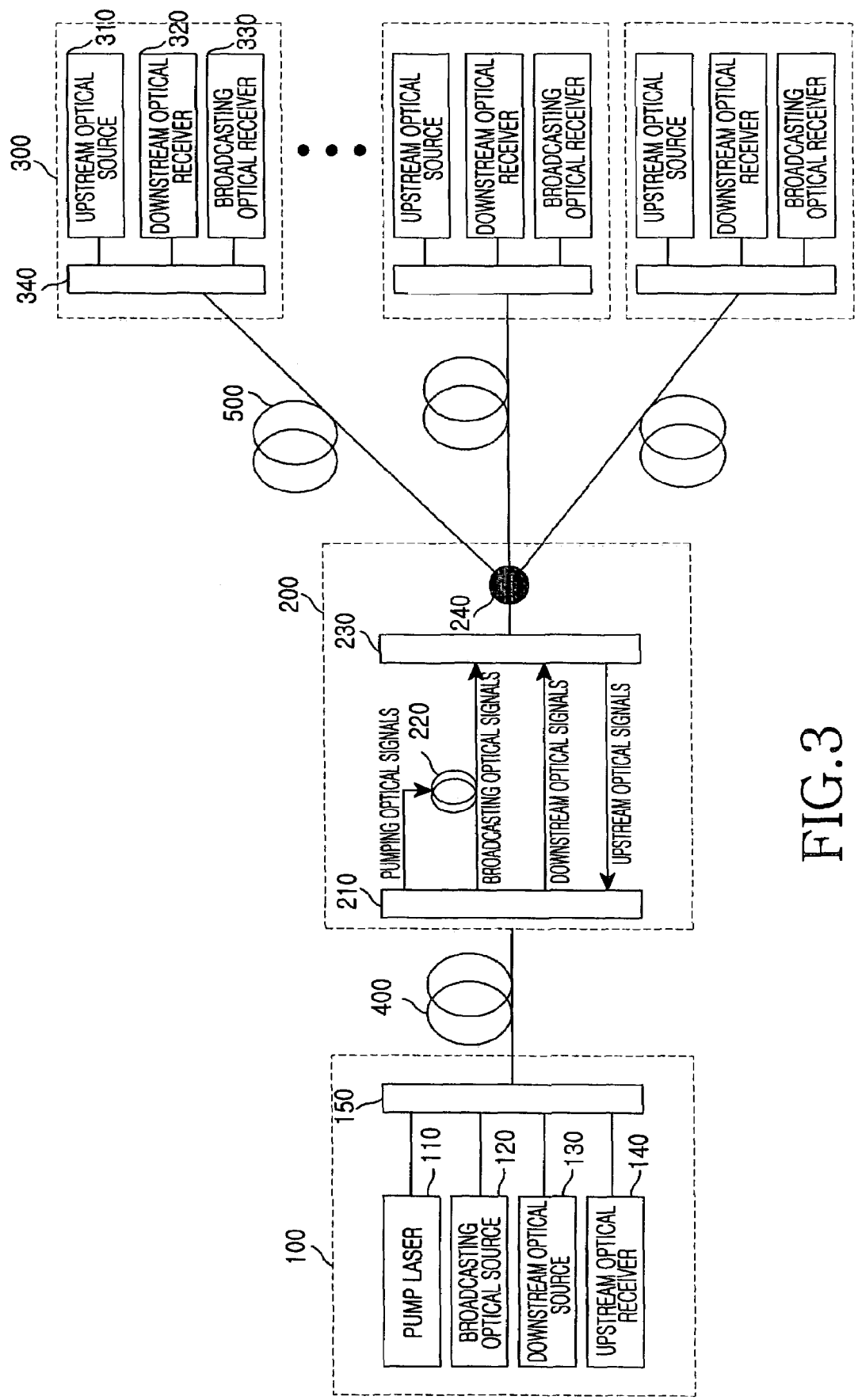
FIG. 3 illustrates a passive optical network (PON) in accordance with a first embodiment of the present invention.

FIG. 3 illustrates a passive optical network in accordance with a first embodiment of the present invention. Referring to FIG. 3, the passive optical network (PON) includes a central office 100, and the central office 100 comprises a pump laser 110, a broadcasting optical source 120, a downstream optical source 130, an upstream optical receiver 140 and an wavelength division multiplexer 150.

The pump laser 110 outputs the pumping optical signals that amplify the optical signals output from the broadcasting optical source 120, the broadcasting optical source 120 outputs the optical signals (hereinafter, referred to as "broadcasting optical signals") that provide the broadcasting service to a plurality of subscriber terminals 300, and the downstream optical source 130 outputs the optical signals (hereinafter, referred to as "downstream optical signals") that provide downstream data service to the subscriber terminals 300 through transmission optical fibers 400 and 500.

The upstream optical receiver 140 receives the upstream data service signals transmitted from each subscriber terminal 300 and converts the received optical signals into electric signals.

The wavelength division multiplexer 150 multiplexes the signals output from the pump laser 110, the broadcasting optical source 120 and the downstream optical source 130, and outputs the multiplexed signals outside. Also, the wavelength division multiplexer 150 filters the upstream data service signals input from the outside, and outputs the filtered signals to the upstream optical receiver 140.

Also, the PON comprises a local office 200, and the local office 200 comprises a first wavelength division multiplexer 210, an optical amplifier media 220, a second wavelength division multiplexer 230, and an optical divider coupler 240.

The first wavelength division multiplexer 210 receives and demultiplexes the multiplexed signals including the pumping optical signals output from the central office 100 through a first transmission optical fiber 400, and thus divides the multiplexed signals into pumping optical signals, broadcasting optical signals and downstream optical signals. Also, the first wavelength division multiplexer 210 multiplexes the upstream optical signals transmitted from the subscriber terminals 300.

The optical amplifier media 220 receives the pumping optical signals and the broadcasting optical signals from the first wavelength division multiplexer 210, and amplifies the broadcasting optical signals by the pumping optical signals. In a preferred embodiment, the optical amplifier media 220 is comprised an erbium-doped fiber (EDF).

The second wavelength division multiplexer 230 multiplexes the broadcasting optical signals amplified by the optical amplifier media 220 and the downstream optical signals divided by the first wavelength division multiplexer 210. Also, the second wavelength division multiplexer 230 demultiplexes the upstream optical signals transmitted from the subscriber terminals 300, and transmits the demultiplexed signals to the first wavelength division multiplexer 210.

The optical divider coupler 240 (preferably a 1×N divider coupler) divides the optical signals, which are multiplexed and output by the second wavelength division multiplexer 230, to the subscriber terminals 300. Also, the optical divider coupler 240 couples the upstream optical signals transmitted from the subscriber terminals 300, and outputs the coupled signals to the second wavelength division multiplexer 230.

Preferably, an optical amplifier (for example, an erbium-doped fiber amplifier) is further arranged between the central office 100 and local office 200, so as to amplify the downstream signals output from the wavelength division multiplexer 150 in the central office 100 and the upstream signals output from the first wavelength division multiplexer 210 in the local office 200.

Then, the pumping optical signals, that are output from the pump laser 110 in the central office 100, operate as a pumping output for the optical amplifier media 220 (for example, an erbium-doped fiber) in the local office 200.

Each of the subscriber terminals 300 of the PON comprises an upstream optical source 310 for outputting the upstream optical signals to transmit data to the central office 100, a downstream optical receiver 320 for receiving the downstream optical signals transmitted downstream from the central office 100, a broadcasting optical receiver 330 for receiving the broadcasting optical signals transmitted downstream from the central office 100, and a wavelength division multiplexer 340 for demultiplexing the optical signals multiplexed and output from the local office 200 and then dividing the demultiplexed signals into the downstream data service signals and the broadcasting service signals. The wavelength division multiplexer 340 also filters a signal output from the upstream optical source 310 and transmits the filtered signal to the local office 200 through a second transmission optical fiber 500.

The operation principle of the PON described above is as follows:

Firstly, in transmitting downstream, the central office 100 multiplexes the downstream optical signals modulated according to data service signals for data service, the broadcasting optical signals modulated according to broadcasting service signals for broadcasting service, and the pumping optical signals with the wavelength division multiplexer 150, so as to output the multiplexed signals through the first transmission optical fiber 400.

Then, The wavelength division multiplexer 210 in the local office 200 demultiplexes the multiplexed signals that have been received through the first transmission optical fiber 400. The resulting pumping optical signals are input into the optical amplifier media 220, such that the broadcasting optical signals are amplified. The second wavelength division multiplexer 230 multiplexes and outputs the broadcasting optical signals amplified as described above and the downstream optical signals, and the optical divider coupler 240 transmits the multiplexed signals output from the second wavelength division multiplexer 230 to the subscriber terminals 300 through the second transmission optical fiber 500.

The wavelength division multiplexer 340 in the subscriber terminals 300 demultiplexes the multiplexed signals input through the second transmission optical fiber 500, and transmits the demultiplexed signals to the downstream optical receiver 320 and the broadcasting optical receiver 330. Then, the receivers 320 and 330 convert the received optical signals into electric signals.

For upstream transmission, the upstream optical source 310 in the subscriber terminals 300 outputs the upstream optical signal modulated according to data signals, and the wavelength division multiplexer 340 filters the upstream optical signals and transmits the filtered signals to the second transmission optical fiber 500. The upstream optical signals, which have been transmitted through the second transmission optical fiber 500 to the optical divider coupler 240 in the local office 200, are coupled by the optical divider coupler 240, are multiplexed through the first and second wavelength division multiplexer 230 and 210, and are transmitted to the central office 100.

In the central office 100, the wavelength division multiplexer 150 demultiplexes the upstream optical signals having been received through the first transmission optical fiber 400, and then the upstream optical receiver 140 converts the demultiplexed signals into electrical signals.

Second Embodiment

Figure 4:
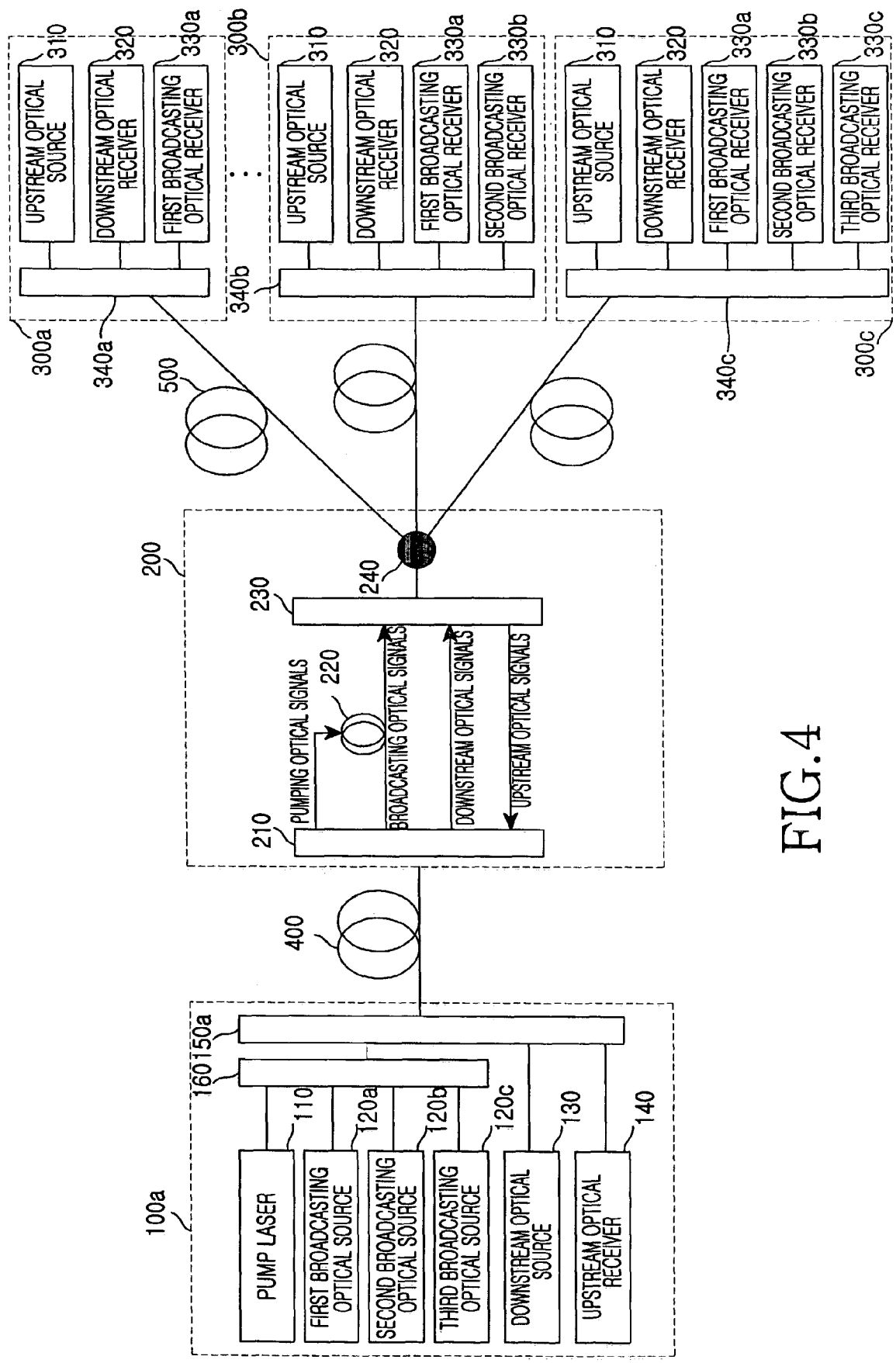
FIG. 4 illustrates a passive optical network (PON) in accordance with a second embodiment of the present invention.

FIG. 4 illustrates a PON in accordance with a second embodiment of the present invention, further including two or more broadcasting optical sources (a first broadcasting optical source 120a, a second broadcasting optical source 120b, and a third broadcasting optical source 120c) in a central office 100a, in addition to the PON illustrated in FIG. 3. The broadcasting optical sources 120a, 120b and 120c are constructed so as to output the broadcasting optical signals having different wavelengths from one another. Also, the embodiment shown in FIG. 4 further includes a wavelength division multiplexer 160 for multiplexing the broadcasting optical signals having different wavelengths from each other as described above. FIG. 4 illustrates inclusion of is another wavelength division multiplexer 150a.

In FIG. 4 subscriber terminals 300a, 300b and 300c may be constructed to comprise a plurality of broadcasting optical receivers (a first broadcasting optical receiver 330a, a second broadcasting optical receiver 330b and a third broadcasting optical receiver 330c) corresponding with the broadcasting optical sources 120a, 120b and 120c, thus enabling each subscriber terminal to selectively receive the broadcasting optical signals. In FIG. 4, a first subscriber terminal 300a comprises a first broadcasting optical receiver 330a, a second subscriber terminal 300b comprises the first and a second broadcasting optical receiver 330a and 330b, and a third subscriber terminal 300c comprises the first, second and a third broadcasting optical receiver 330a, 330b and 330c.

Figure 5:
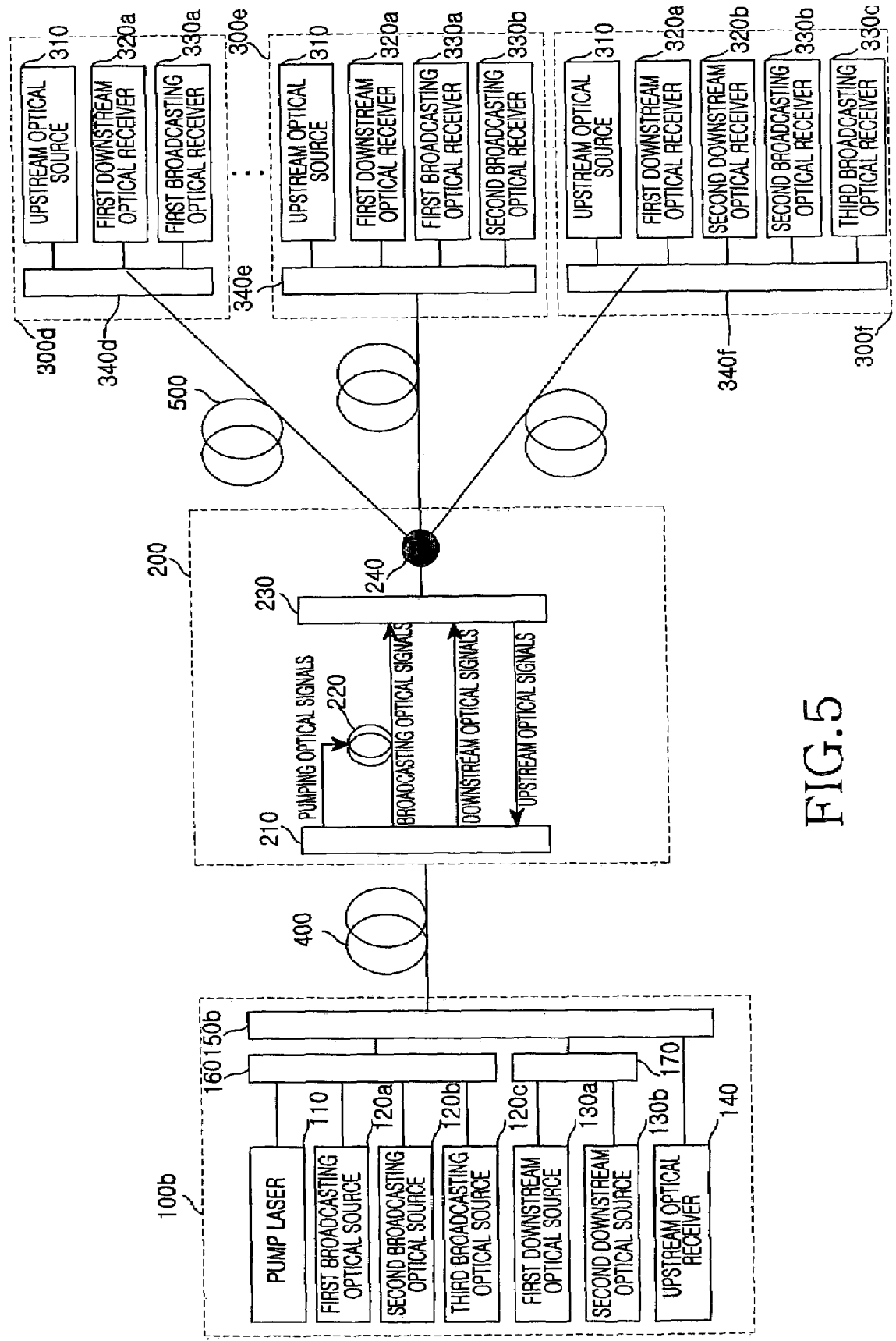
FIG. 5 illustrates a passive optical network (PON) in accordance with a third embodiment of the present invention.

As illustrated in FIG. 4, the PON may provide a great variety of broadcasting services to subscribers. That is, the central office 100a may transmit varied broadcasting channels with greater capacity according to the subscribers' demands, by using the broadcasting optical sources 120a, 120b and 120c. For example, it is possible that the first broadcasting optical source 120a provides a general and popular broadcasting service and the second and third broadcasting optical source 120b and 120c provide a professional broadcasting service for professionals and hobbyists. Then, subscribers may selectively use the broadcasting service according to the interest of each one, with the payment of a predetermined charge Third Embodiment FIG. 5 illustrates a PON in accordance with a third embodiment of the present invention comprising two or more broadcasting optical sources (a first broadcasting optical source 120a, a second broadcasting optical source 120b, and a third broadcasting optical source 120c) and two or more downstream optical sources (a first downstream optical source 130a and a second downstream optical source 130b) in a central office 100b, in addition to the PON illustrated in FIG. 3. The broadcasting optical sources 120a, 120b and 120c and the downstream optical sources 130a 130b are configured to output the broadcasting optical signals or the downstream optical signals having different wavelengths from one another. Also, the third embodiment shown in FIG. 5 further includes a wavelength division multiplexer 160 for multiplexing the broadcasting optical signals and a wavelength division multiplexer 170 for multiplexing the downstream optical signals, such that each signal has a different wavelength from the others as described above. In FIG. 5 another wavelength division multiplexer 150b is provided in this embodiment.

In this case, subscriber terminals 300d, 300e and 300f may comprise a plurality of broadcasting optical receivers (a first broadcasting optical receiver 330a, a second broadcasting optical receiver 330b and a third broadcasting optical receiver 330c) and a plurality of downstream optical receivers (a first downstream optical receiver 320a and a second downstream optical receiver 320b), corresponding to the broadcasting optical sources 120a, 120b and 120c and the downstream optical sources 130a and 130b, thus enabling each subscriber terminal to selectively receive the broadcasting optical signals or the downstream optical signals according to the interest of the subscriber. In FIG. 5, a subscriber terminal 300d comprises the first downstream optical receiver 320a and the first broadcasting optical receiver 330a, another subscriber terminal 300e comprises the first downstream optical receiver 320a and the first and second broadcasting optical receiver 330a and 330b, and another subscriber terminal 300f comprises the first and second downstream optical receiver 320a and 320b, and the second and third broadcasting optical receiver 330b and 330c.

That is, the third embodiment describes a configuration of the PON that may accept greater capacity for the data service as well as the broadcasting service according to the demand of the subscribers. Therefore, the PON, such as the third embodiment illustrated in FIG. 5, can provide a data service having a greater capacity to the subscribers, by using a plurality of optical sources for the increased data service.

As described in the above, the passive optical network system in accordance with the present invention amplifies the optical signals for the broadcasting service in the optical amplifier media of the local office by the pumping optical signals generated from the central office, and provides the amplified optical signals for the broadcasting service to the subscriber terminals. Therefore, the transmission loss of the optical signals for the broadcasting service, that occurs between the central office and the local office, may be mitigated, so that the output level of the optical signals, that are input to the broadcasting optical receiver of the subscriber terminals, may be maintained at a high state without reducing the number of branches of the optical divider coupler in the local office. That is, an advantage of the present invention is that it is capable of simultaneously providing broadcasting service and data service for more subscribers without reducing the number of subscribers to the PON.

Therefore, the PON according to the present invention doesn't require the cost for respectively constructing each of a data service network and a broadcasting service network and may reduce the investment cost and time in order to maintain and operate the network. For this reason, it is an advantage that the operator may efficiently provide a greater variety of services to the subscribers with low cost.

Also, the present invention uses a plurality of optical sources for the data service and the broadcasting service and received the optical signals generated from these optical sources by using a plurality of optical receivers in the subscriber terminals, so that the present invention may conveniently and easily provide a greater amount and variety of data services and broadcasting services.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A passive optical network system comprising a central office, a local office, and a plurality of subscriber terminals, the local office and the central office being connected to each other through an optical fiber, the subscriber terminals being connected to the local office, the central office providing optical communication service to the subscriber terminals through the local office, the local office comprising:
a first wavelength division multiplexer for:
receiving multiplexed signals from the central office, and demultiplexing the received multiplex signals into respective downstream optical signals for downstream data service, broadcasting optical signals for broadcasting service and pumping optical signals, and
multiplexing upstream data service signals transmitted from the subscriber terminals;
an optical amplifier media that receives the broadcasting optical signals and the pumping optical signals from the first wavelength division multiplexer, such the broadcasting optical signals are amplified by the pumping optical signals;
a second wavelength division multiplexer that multiplexes the broadcasting optical signals amplified by the optical amplifier media and the downstream optical signals, the second wavelength division multiplexer demultiplexing the upstream data service signals transmitted from the subscriber terminals; and
an optical divider coupler that divides the multiplexed optical signals transmitted from the second wavelength division multiplexer, so as to distribute the divided signals to the subscriber terminals, the optical divider coupler further coupling the upstream data service signals transmitted from the subscriber terminals.

2. The passive optical network system of claim 1, wherein the optical amplifier media is an erbium-doped fiber amplifier.

3. The passive optical network system of claim 1, wherein the central office comprises:
a broadcasting optical source that outputs the broadcasting optical signals that provide a broadcasting service to the subscriber terminals;
a pumping optical source that outputs the pumping optical signals;
a downstream optical source that outputs the downstream optical signals that provide a downstream data service to the subscriber terminals;
an upstream optical receiver that receives the upstream data service signals transmitted from the subscriber terminals and then converts the received signals into electric signals; and
a central office wavelength division multiplexer for:
multiplexing the broadcasting optical signals, the pumping optical signals, and the downstream optical signals, such that the multiplexed signals are output, and
demultiplexing input upstream data service signals, such that the demultiplexed signals are output to the upstream optical receiver.

4. The passive optical network system of claim 1, wherein the central office comprises:
a plurality of broadcasting optical sources that output of the broadcasting optical signals having different wavelengths;
a first central office wavelength division multiplexer that multiplexes the broadcasting optical signals output from the broadcasting optical sources;
a pumping optical source that outputs the pumping optical signals;
a downstream optical source that outputs the downstream optical signals to provide downstream data service to the subscriber terminals;

an upstream optical receiver width receives the upstream data service signals transmitted from the subscriber terminals, such that the received signals are converted into electric signals; and a second central office wavelength division multiplexer for:
- multiplexing the multiplexed broadcasting optical signals, the pumping optical signals, and the downstream optical signals output from the downstream optical source, such that the multiplexed signals are output, and
- demultiplexing the upstream data service signals, such that the demultiplexed signals are output to the upstream optical receiver.

5. The passive optical network system of claim 1, wherein the central office comprises:

a plurality of broadcasting optical sources that output different wavelengths of broadcasting optical signals having different wavelengths;

a central office first wavelength division multiplexer that multiplexes the broadcasting optical signals output from the broadcasting optical sources;

a pumping optical source that outputs the pumping optical signals;

a plurality of downstream optical sources that output the downstream optical signals having different wavelengths that provide downstream data service to the subscriber terminals;

a second central office wavelength division multiplexer that multiplexes the downstream optical signals output from the downstream optical sources;

an upstream optical receiver that receives the upstream data service signals transmitted from the subscriber terminals, such that the received signals are converted into electric signals; and a third central office wavelength division multiplexer for:
- multiplexing the broadcasting optical signals multiplexed by the first central office wavelength division multiplexer, the downstream optical signals multiplexed by the second central office wavelength division multiplexer, and the pumping optical signals output from the pumping optical source, such that the multiplexed signals are output, and
- demultiplexing the upstream data service signals, such that the demultiplexed signals are output to the upstream optical receiver.

* * * * *